No. 665,758. Patented Jan. 8, 1901.
W. B. SAYERS.
ELEVATOR.
(Application filed Sept. 14, 1900.)
(No Model.)
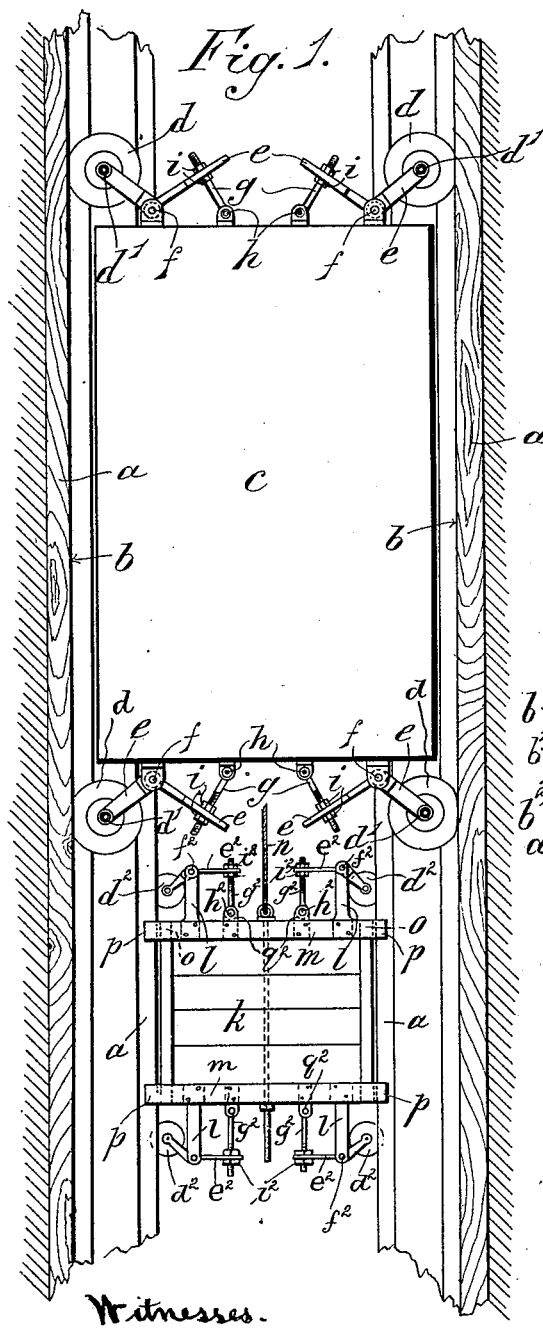
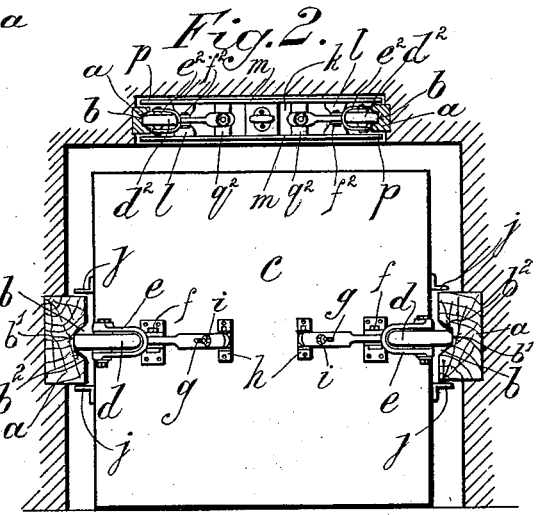
Witnesses.
Geo. E. Frich.
Chas. R. Wright Jr.
Inventor.
W. B. Sayers,
by A. S. Pattison
atty.
THE NORRIS PETERS CO., PHOTO-LITHO., WASHINGTON, D. C.

UNITED STATES PATENT OFFICE.

WILLIAM BROOKS SAYERS, OF GLASGOW, SCOTLAND.

ELEVATOR.

SPECIFICATION forming part of Letters Patent No. 665,758, dated January 8, 1901.

Application filed September 14, 1900. Serial No. 30,033. (No model.)

*To all whom it may concern:*

Be it known that I, WILLIAM BROOKS SAYERS, a subject of the Queen of Great Britain and Ireland, residing at Glasgow, in the county of Lanark, Scotland, have invented Improvements in or Relating to Elevators, of which the following is a specification.

This invention consists in improvements in elevators, particularly passenger-elevators, the object being to enable the cages to run smoothly and with but little friction. For this purpose in place of vertical guide-rails, such as are commonly provided in elevator-wells, and in place of the slippers carried by the cages and adapted to fit and slide along the said rails I provide the well with vertical guideways formed with longitudinal grooves or channels and I mount upon the cage antifriction wheels or rollers provided with pneumatic tires so arranged as to run in the said grooves or channels, which are provided with flat bottom portions for the wheels or rollers to run upon and with sloping slides diverging outwardly to act as guides. The cage is sometimes provided with safety-guides adapted to extend beyond the faces of the guideways, on opposite sides thereof, and so arranged as to come into contact with the sides of the guideways only should the wheels or rollers become ineffectual, and thereby to prevent the cage from oscillating to such an extent as to catch against the floor-landings or other projections. The guideways need not be set with such accuracy as has been necessary with guide-rails as heretofore used, and dirt arising from the lubrication of the guide-rails and slippers is avoided. The balance weight or weights may also be furnished with wheels having pneumatic tires adapted to run in the grooves of guideways such as those hereinbefore referred to, safety-guides being also provided, if desired.

Figures 1 and 2 of the accompanying drawings are respectively a sectional elevation and a sectional plan of an example of an elevator constructed according to this invention.

Two guideways $a$, provided with grooves $b$, are arranged opposite to each other within the well and on a vertical plane passing through the center of the cage $c$, and a pair of pneumatic wheels or rollers $d$ are provided to run in each groove, one of each pair being arranged at or near the top and the other at or near the bottom of the cage $c$. The arrangement and number of the guideways, with wheels or rollers, may, however, be varied as may be desired. The bottom portions $b'$ of the grooves $b$ for the wheels or rollers $d$ to run upon are made flat to avoid friction, while the sides $b^2$ of the grooves $b$, which act as guides, slope outward from the bottoms of the grooves for the same purpose. The wheels or rollers $d$ are preferably mounted in ball-bearings, as shown at $d'$ in Fig. 1, and are made adjustable toward and from the guideways, so as to enable the pressure between their tires and the guideways to be properly adjusted. In the example each wheel or roller $d$ is carried by one arm of a bell-crank lever $e$, which is pivoted to the cage at $f$, and the other arm of which has passing through it a screw-threaded pin $g$, that is pivoted to the cage at $h$ and is provided with a pair of nuts $i$, adapted to clamp the corresponding arm of the lever $e$ and so hold the wheel or roller $d$ in the position for giving the desired pressure.

$j$ represents angle-irons secured to the cage $c$ and extending beyond the faces of the guideways $a$, so as to act as safety-guides adapted to prevent transverse movement of the cage, such as would involve a risk of its catching against the floor-landings or other projections. The pneumatic-tired wheels or rollers $d^2$ of the balance-weights $k$ are in the example carried by bent levers $e^2$, pivoted at $f^2$ to brackets $l$, secured to cross-beams $m$, between which the weights $k$ are threaded on the rope $n$. The pneumatic-tired wheels or rollers $d^2$ of the weights $k$ are mounted in ball-bearings like those of the cage and run in outwardly-widening grooves $b$, made in guideways $a$ and having flat bottom portions and sloping sides like those provided for the cage. Each beam $m$ is made up of two parallel bars kept apart by distance-pieces $o$ and having projecting portions $p$, adapted to act as safety-guides should the wheels or rollers $d^2$ become ineffectual through any accident. Lugs $q$, secured to the beams $m$, have pivoted to them at $h^2$ screwed pins $g^2$, carrying nuts $i^2$ for adjusting the levers $e^2$.

What I claim is—

1. In an elevator, the combination, with a moving body, of guide wheels or rollers having resilient tires, and guideways having grooves with flat bottom portions on which the said wheels or rollers bear, and outwardly-diverging sides adapted to act as guides to the said wheels or rollers.

2. In an elevator, the combination, with a moving body, of guide wheels or rollers having resilient tires, guideways having grooves with flat bottom portions on which the said wheels or rollers bear, and outwardly-diverging sides adapted to act as guides to the said wheels or rollers, and safety-guides secured to the said body and adapted to come into contact with the said guideways and so prevent considerable transverse movement of the said body should the said wheels or rollers become inoperative.

3. In an elevator, the combination, with a moving body, of guide wheels or rollers having resilient tires, guideways having grooves with flat bottom portions on which the said wheels or rollers bear, and outwardly-diverging sides adapted to act as guides to the said wheels or rollers, and means for adjusting the said wheels or rollers in relation to the said body for the purpose of varying their pressure on the said guideways.

4. In an elevator, the combination, with a moving body, of guide wheels or rollers having resilient tires, guideways having grooves with flat bottom portions on which the said wheels or rollers bear, and outwardly-diverging sides adapted to act as guides to the said wheels or rollers, levers which are pivotally secured to the said body and on which the said wheels or rollers are mounted, and screw devices adapted to act between the said body and the said levers and thereby to vary the pressure of the said wheels or rollers on the said guideways.

5. In an elevator, the combination, with a moving body, of guide wheels or rollers having resilient tires, guideways having grooves with flat bottom portions on which the said wheels or rollers bear, and outwardly-diverging sides adapted to act as guides to the said wheels or rollers, bent levers which are pivotally secured to the said body and on the outer arms of which the said wheels or rollers are mounted, screw-threaded pins pivotally secured to the said body, and nuts located on the said pins and adapted to engage the inner arms of the said levers for the purpose of varying their pressure on the said guideways.

Signed at Glasgow, in the county of Lanark, Scotland, this 3d day of September, 1900.

WILLIAM BROOKS SAYERS.

Witnesses:
 F. MURRAY,
 J. ALLISON GLASS.